March 3, 1942.　　　　E. E. WEMP　　　　2,275,388
CLUTCH AND CLUTCH CONTROL
Filed March 28, 1938　　　　4 Sheets-Sheet 1
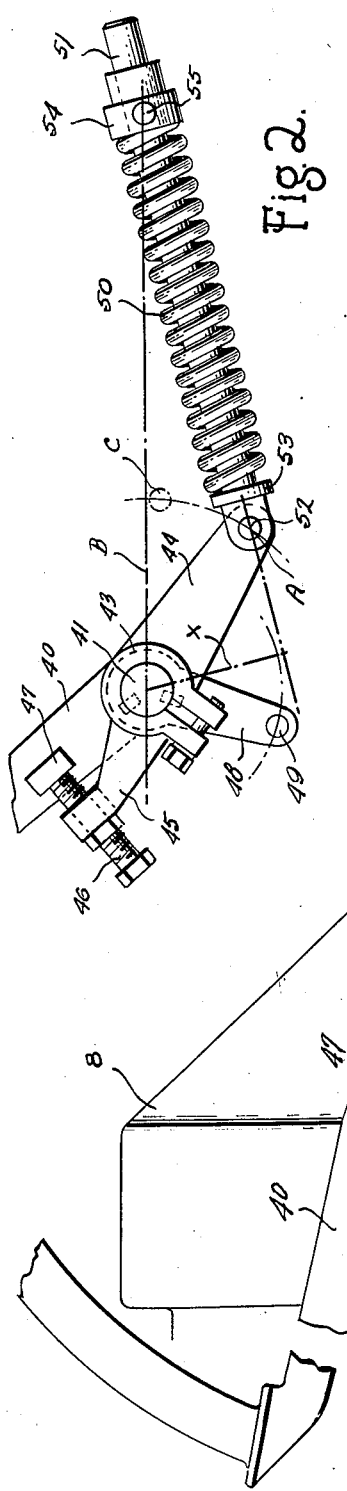
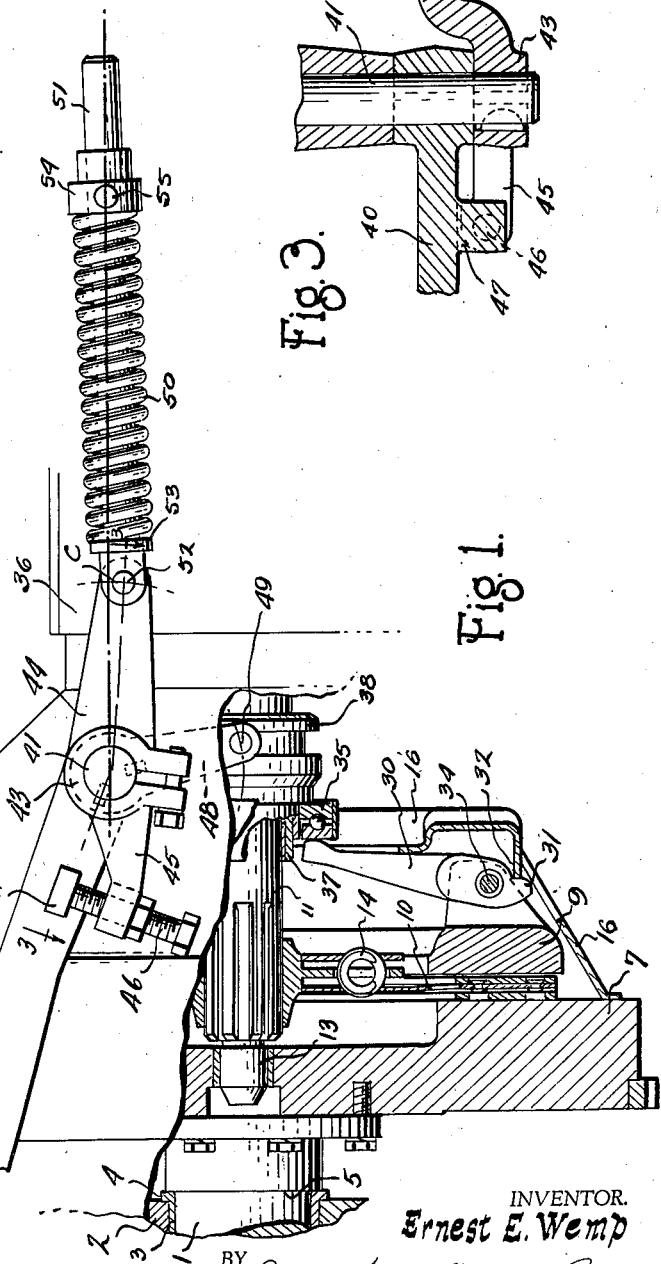
INVENTOR.
*Ernest E. Wemp*
BY *Barnes, Kisselle, Laughlin & Raisch*
ATTORNEYS March 3, 1942.   E. E. WEMP   2,275,388
CLUTCH AND CLUTCH CONTROL
Filed March 28, 1938   4 Sheets-Sheet 2

INVENTOR.
Ernest E. Wemp
BY Barnes, Kisselle, Laughlin & Raisch
ATTORNEYS

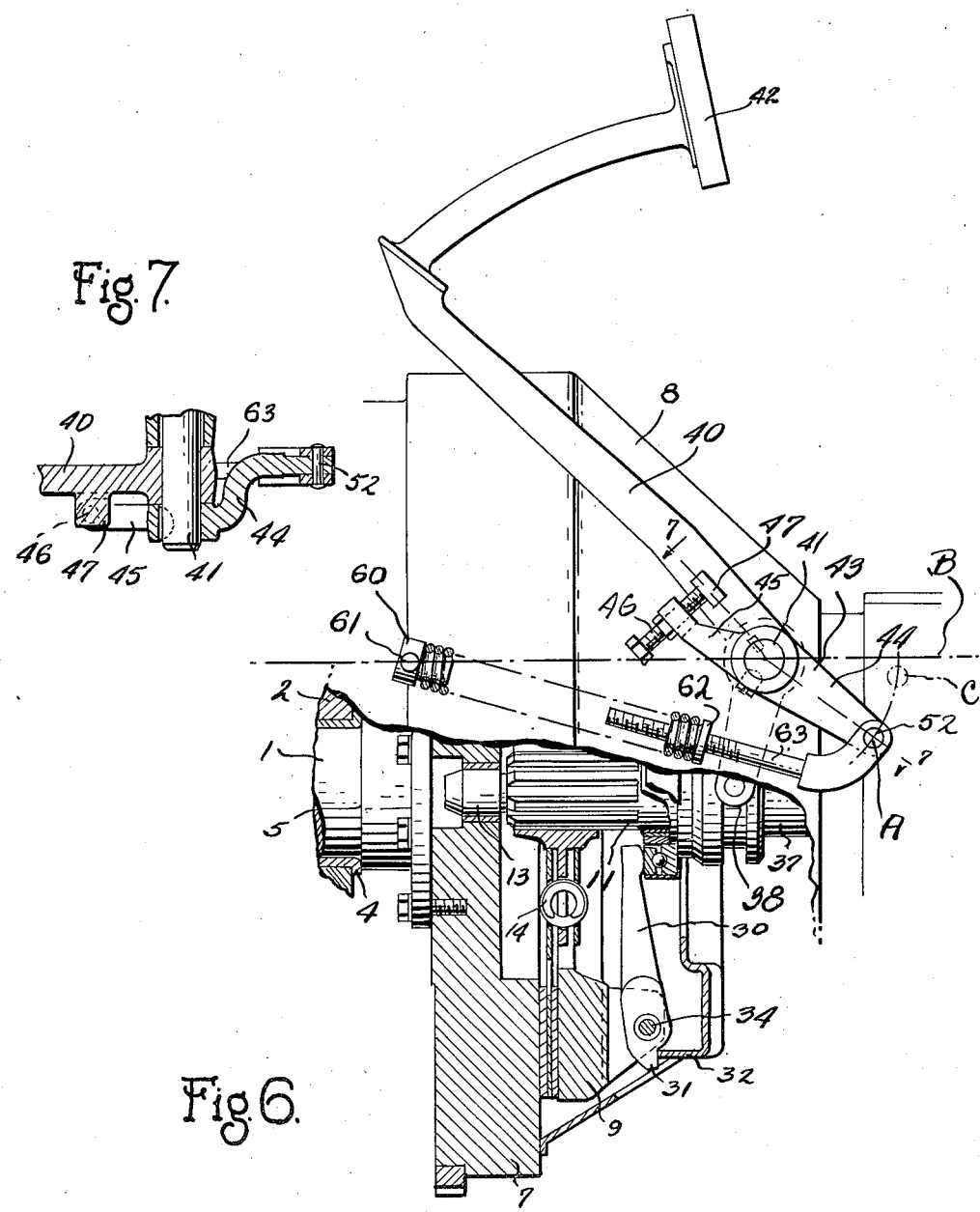

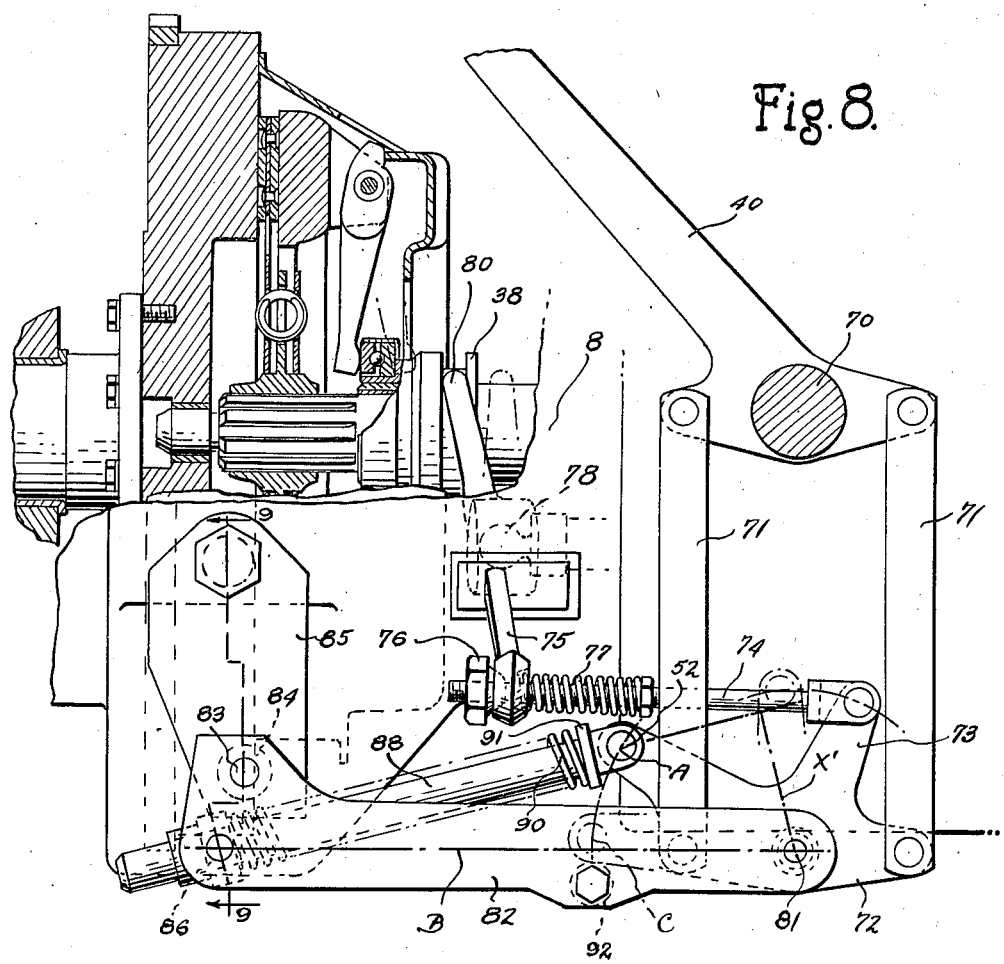

Patented Mar. 3, 1942

2,275,388

UNITED STATES PATENT OFFICE 2,275,388

CLUTCH AND CLUTCH CONTROL

Ernest E. Wemp, Detroit, Mich.

Application March 28, 1938, Serial No. 198,388

8 Claims. (Cl. 192—89)

This invention relates to a clutch and clutch control particularly useful in automotive vehicles. It has to do with a clutch construction wherein packing pressure is afforded by means such as a spring so arranged as to give a clutch control action, wherein little effort is required to hold the clutch disengaged.

In accordance with the invention the spring means for exerting clutch packing pressure is advantageously located outside the clutch construction per se. Operating and control mechanism is associated with the clutch, and this may include a lever or so-called clutch pedal arranged to be pushed or depressed by the foot of the operator of the vehicle. This mechanism has associated therewith a clutch packing spring, the force of which is transmitted to the clutch for clutch engagement and which force is relieved and taken by the foot of the operator when the clutch pedal is depressed for clutch disengagement.

There is a tendency at the present time, in the automobile art, to use various sorts of automatic or power operated devices for minimizing the number of operations which the driver of a vehicle is required to make, or to supplement power so that the operations do not require so much physical effort. Where automatic mechanism is used, such mechanism is often relatively costly, and then, too, such mechanism often introduces new or different movements or modes of operation. Where different movements or modes of operation are required, thus departing from the conventional, there is a considerable resistance to commercializing the structure, and a program of educating the public is sometimes necessary. Where power devices are used for supplementing physical effort, such devices add to the expense, often do not minimize the actual number of operating movements, but merely reduce the physical effort required, and in addition, such mechanism is subject to becoming defective or worn in use.

In accordance with this invention a clutch and control is provided which has the advantage of being operated in a conventional manner with the conventional movements, but wherein the physical effort required, particularly at certain times when a prolonged application of physical effort is required, is lessened in a material degree. This is accomplished without the introduction of either an automatic means or a power means for supplementing physical effort, and, to the contrary, is accomplished with a construction which really simplifies the entire arrangement.

In the operation of an automotive vehicle, particularly in city driving or driving in heavy traffic, the clutch has to be frequently held in disengaged position for relatively extended periods of time. This occurs at a traffic light or when creeping along in congested traffic. Ordinarily, with a clutch having packing springs in it, the entire force of the packing springs must be resisted and overcome when the clutch is held disengaged, and there are occasions when this becomes very tiresome. With the present invention, however, although the clutch is engaged by spring action, it may be held disengaged with a minimum of effort. Yet the clutch, when it is engaged, may be so engaged with a packing pressure fully equal to the packing pressure of the present day clutches. This may be accomplished by mounting a spring or packing pressure device in such a way that the spring acts through requisite leverage when the clutch is engaged, but wherein the effective leverage is materially reduced when the clutch is disengaged. More specifically, this may be done by an arrangement wherein a rock-shaft or pivoted member may be used in the clutch control upon which the spring exerts a relatively high turning moment for clutch engagement and exerts a relatively low turning moment when the clutch is disengaged.

Several forms of devices are shown in the accompanying drawings for carrying out the invention, and in the drawings Fig. 1 is a view illustrating a clutch and control constructed in accordance with the invention with the clutch in released position.

Fig. 2 is a view of a spring and associated parts in engaged position.

Fig. 3 is a cross sectional view taken substantially on line 3—3 of Fig. 1.

Fig. 6 is a view similar to Fig. 1 illustrating a modified form of the invention showing the clutch engaged.

Fig. 7 is a view taken substantially on line 7—7 of Fig. 6.

Fig. 8 is a view showing a further modified arrangement with parts cut away and with some parts in section.

Fig. 9 is a sectional view taken substantially on line 9—9 of Fig. 8.

Fig. 10 is a detail view illustrating the pivotal mounting for a clutch control arm.

Figure 4:
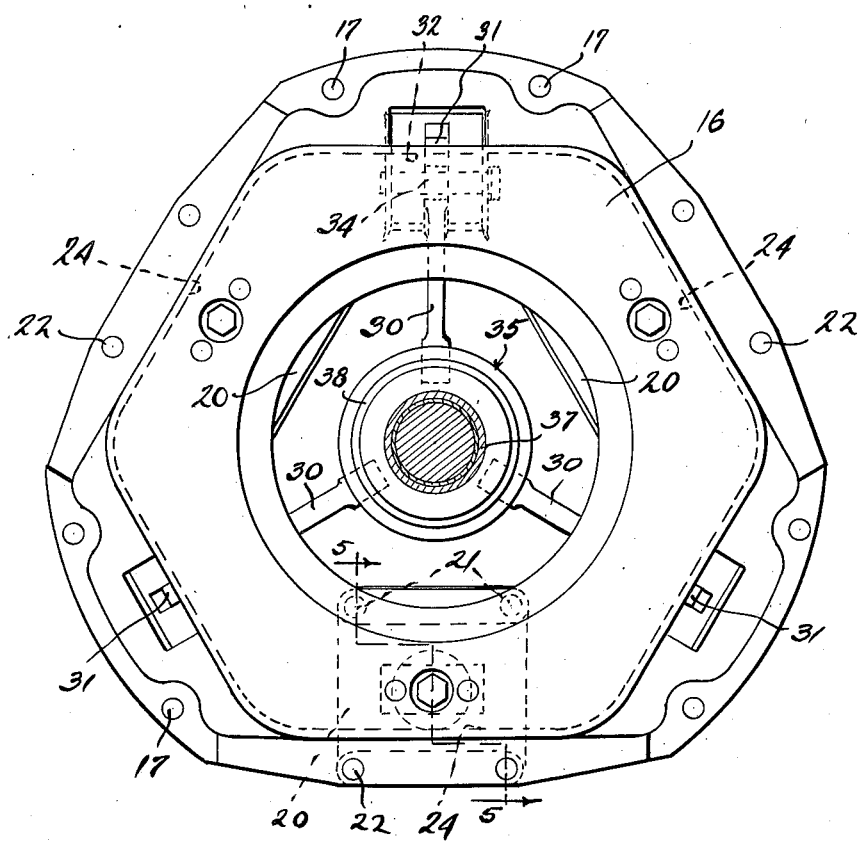
Fig. 4 is a rear elevational view of the clutch.

In Fig. 1 the crankshaft of an internal combustion engine is illustrated at 1 mounted in a part 2 of the engine and in a bearing 3 which has a flange 4 to take the thrust of a shoulder 5 on the crank-shaft. In the form of the clutch shown herein the reaction of the packing pressure is delivered as a thrust load on the crank-shaft of the engine and is not balanced out locally in the clutch construction. The clutch construction, as illustrated, includes a flywheel 7 mounted on the end of the crank-shaft and rotatable in a bell housing 8. A pressure plate 9 is arranged to be disposed in packed relation against a driven member 10 mounted on a driven shaft 11, which driven shaft may be piloted in the flywheel as at 13. The driven member may have a vibration dampening construction as shown at 14.

Figure 5:
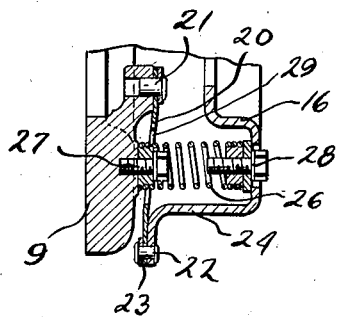
Fig. 5 is a view taken substantially on line 5—5 of Fig. 4.

A clutch cover plate is illustrated at 16, the general shape of which may be substantially as illustrated in Fig. 4, the same having apertures 17 in its peripheral flange for attachment to the flywheel by means of cap screws or the like. The pressure plate is connected to the flywheel and cover plate to rotate therewith and this is done preferably by an arrangement as illustrated in Fig. 5. Flexible segmental sheet metal driving plates 20 are secured at their inner edges to the pressure plate, as illustrated at 21 and to the cover plate at their outer edges as illustrated at 22, and the cover plate may have apertures 23 in its peripheral flange for this purpose. As illustrated in Fig. 4 there are three of such flexible drive plates disposed in spaced circumferential relation. They serve to drive the pressure plate, hold it centered and yet are flexible to permit axial shift. As the pressure plate shifts, the distance between the points 21 and 22 varies, and the portions 24 of the cover plate may flex to accommodate this variation.

The clutch in itself is normally disengaged, and to this end the clutch may have relatively light retractor springs 26 secured to the pressure plate as at 27 and to the cover plate as at 28. As illustrated in Figs. 4 and 5 there may be three of such retractor springs with each spring disposed so as to extend through an aperture 29 in one of the driving plates.

Clutch levers which are preferably of the second order and which may be three in number, as illustrated in Fig. 4, are substantially radially disposed. The levers are illustrated generally at 30, each having an outer end 31 arranged to fulcrum on a suitably fashioned part 32 of the cover plate, and being pivoted to the pressure plate as at 34. The inner ends of the levers are in proximity to the axis and are arranged to be engaged by a thrust bearing preferably of the antifriction type, as illustrated at 35. The case for the transmission gears illustrated at 36 may have an extension 37 for slidably receiving a grooved member 38 which carries the bearing 35.

The operating mechanism may take the form of a lever or so-called clutch pedal 40 equipped with a foot pad, not shown in Fig. 1, but illustrated in Fig. 6, and this lever may be journaled on a clutch rock-shaft 41. A member 43 is fixed to the rock-shaft to rotate therewith and it has oppositely extending arms, one at 44 and one at 45. The arm 45 may have an adjusting screw 46 arranged to be engaged by an abutment 47 on the pedal. This rock-shaft has a yoke 48 with pins 49 arranged to engage in the groove of the member 38.

A clutch packing spring is illustrated at 50 mounted around a rod 51 which is pivotally connected as at 52 to the arm 44, and which has a shoulder 53 upon which the spring acts. The rod 51 extends slidably through a pivotally mounted abutment member 54, the pivot being illustrated at 55 and the spring reacts against the abutment 54. In the normal clutch engaged position the spring and associated control mechanism takes substantially the position as illustrated in Fig. 2. The spring, being a compression spring, tends to rock the member 43 and the rock-shaft 41 clockwise as Figs. 1 and 2 are viewed; this force shifts the member 38 and bearing 35 to the left and causes the clutch levers 30 to swing. The lever 30, as illustrated in Fig. 1, is caused to rock counter-clockwise around its fulcrum 32, and this shifts the pressure plate 9 to the left and effects clutch engagement.

It will be seen at this time that the spring is exerting a considerable turning moment or force on the rock-shaft. The center of the connection 52, as shown in Fig. 2, which is called position A, is a considerable distance from the center line B between the rock-shaft 41 and the pivotal mounting 55. The effective leverage, therefore, is equal to the distance between the center of the rock-shaft 41 and the extended center line of the rod 51, measured perpendicular to the extended center line of rod 51, as indicated by the dotted lines X in Fig. 1. When the operator desires clutch release, the pedal 40 is depressed, as illustrated in Fig. 1. When depressed substantially to its lowest position, the pivotal connection 52 has shifted to position C which is very close to the centerline B. Therefore, the turning moment of the spring has been materially reduced.

A specific example might be given to exemplify more clearly a condition of operation. Let it be assumed that a clutch is desired which has a clutch packing pressure when fully engaged of about 1200 lbs. When the spring is in the position as shown in Fig. 2, it is exerting about 135 lbs., but this force, acting through the lever advantage afforded by the clutch levers of the second order, and such other advantage as may be obtained by the relative dimensions of the arm 44 and yoke 48, is stepped up to the required 1200 lbs. When the pedal is initially depressed it may require in the neighborhood of 25 or 30 lbs. to overcome the spring in its Fig. 2 position, but, of course, this can be regulated by determining the advantage afforded by the control pedal. As the clutch is released the pivotal connection 52 moves toward the center line position, and gradually the effort required on the part of the operator decreases progressively. In one installation which has been made in an automotive vehicle, the pressure required of the operator to hold the pedal depressed was hardly more than that required to operate the accelerator; practically, the mere weight of the foot was all that was necessary to hold the clutch completely disengaged. Therefore, although the clutch is operated with the conventional movements, the effort required to hold the clutch disengaged is practically negligible. When a clutch is to be held disengaged frequently or over long periods of time, it may be easily accomplished while the transmission remains in gear.

The figures given above in the example are recited for exemplary purposes only, as, of course, these figures may vary with clutches of different capacities. The precise position and distance of locations A and C from the center line B are also subject to variation. Of course, if the position C is arranged to move to the center line, the pressure required to hold the spring in this position would be nil. But it is not desirable to have position C move over the center line, because then the pedal would have to be pulled back over center to effect clutch engagement, and this would require an additional operation on the part of the operator or the addition of a pedal return spring. With the arrangement shown, the spring is compressed when the pedal is shifted for clutch disengagement. Therefore, the force exerted by the spring when the connection 52 is in position C is greater than when the connection 52 is in position A. With a spring of about 135 lbs. exerted through position A, such spring may exert about 208 lbs. through position C, but position C may be brought into such proximity to the center plane that the physical effort required to hold this position is almost negligible as above pointed out.

Another advantage of this construction is the elimination of a number of springs usually required in a clutch where coil springs are arranged in an annulus; and, furthermore, the spring is disposed remote from the friction members of the clutch, and therefore is not subject to being heated or overheated by the heat caused by friction. Still further, by eliminating the springs in the clutch construction per se, the dimensions of the clutch may be reduced, or, more room is provided so that the levers and such other associated mechanism may be appropriately designed.

In Figs. 6 and 7, a similar arrangement is shown wherein the spring is of the tension type. For the most part, the elements carry the same reference characters as those parts previously described. The foot pad for the clutch pedal, however, is illustrated at 42. In this form the spring has one end securely fastened to a member 60 pivotally mounted on a fixed pivot as at 61, and its other end secured to a member 62, which member 62 is preferably screw-threaded for adjustment purposes on a tension rod 63 which is connected to the member 44 at the pivotal connection 52. Only one position is illustrated for this construction, but it will readily be perceived that as the pedal is pushed downwardly the abutment 47 causes the member 43 to rock counter-clockwise for clutch disengagement, the pivotal connection 52 moving from position A toward position C in proximity to the center line B through the centers of the pivotal connections 61 and the rock-shaft. Thus it will be noted that a spring of the tension or compression type may be used.

It will also be observed that in both forms, as well as in the forms shown in Figs. 8 to 10, that when the pedal is depressed to take the force of the spring off the thrust bearing that the retractor springs, which are relatively light, serve to disengage the clutch by retracting the pressure plate.

A still further form is illustrated in Fig. 8, this form embodying certain parallel linkage to take care of a condition where the engine is mounted on flexible mountings so that it may rock and shift due to vibrations and torque. For the most part, previously described elements have the same reference characters applied. In this form, the clutch control lever or pedal 40 is mounted on a fixed axis 70, and through parallel links 71 is connected to a rocker member 72. This rocker member has an arm 73 connected to a rod 74 which extends through an aperture in the end of a clutch control arm 75. The rod 74 has a nut or abutment on its end, as illustrated at 76, for engaging one side of the arm 75, and is equipped with a spring 77 for maintaining a snug connection. The arm 75 preferably has a ball and socket mounting, as illustrated at 78 in the bell housing 8, and its inner end is of yoke formation and engages in the groove in the member 38, the inner end being illustrated at 80.

The member 72 is pivotally mounted as at 81 to a reaction arm 82 which in turn is pivotally mounted as at 83 to a stud 84 fixed to a bracket 85 mounted on the engine or bell housing. The reaction arm 82 may be of double formation or construction, as illustrated in Fig. 9. A rod 88 is pivotally connected as at 52 (using the reference character 52 again, as it corresponds to the same parts heretofore described), and the rod slidably fits in an abutment 86 with trunnions 87 swivelled in the two parts of the reaction arm 82. A compression spring 90 is located between the abutment 86 and an abutment 91 on the rod 85.

In the normal position, the parts are substantially as illustrated by the full lines in Fig. 8. The compression spring is tending to expand and therefore tends to rock the member 72 clockwise on its pivotal mounting 81, and thus the rod 74 pulls on the arm 75 and rocks the inner end 80 to the left for clutch engagement. In this position the connection 52 is in position A. When the pedal is depressed for clutch disengagement, the pivotal connection 52 moves toward the position C in proximity to the center line B between pivotal mounting 81 and the trunnions 87. A bolt or cross piece 92 may extend across the two-part reaction arm 82 to serve as a limit stop for limiting the disengaging movement and for determining position C. Therefore, in this form it will be noted that when the clutch is engaged the spring acts through a moment calculated by the perpendicular distance from the extended center line of rod 88 through position A to the center of pivot 81, as shown by dotted lines X', and when disengaged the spring operates through a much lower moment calculated by the perpendicular distance from the extended center line of rod 88 to the center of pivot 81. The position of some of the parts in clutch disengaged position is illustrated by the dotted lines in Fig. 8.

The problem of providing a clutch with a manual control which can be operated with requisite ease has heretofore been acute, due to the fact that two conflicting things are encountered. If the mechanical advantage of the clutch pedal is increased to obtain an easy action, the amount of spring deflection or compression is decreased for a given pedal movement and by the same token, the retracting movement of the pressure plate is decreased. A clutch pressure plate requires adequate retracting movement to obtain full clutch release, particularly where a driven member of the cushion variety is used which collapses or partially collapses under clutch packing pressure. As the pressure plate is retracted, the driven member expands and the clutch remains in frictional engagement until the pressure plate has been retracted some considerable distance. The range of movement of a clutch pedal in an automobile is pretty well limited. It will be seen, therefore, that with a fairly well fixed amount of pedal movement, if the mechanical advantage of the lever is increased the pressure plate may not be retracted sufficiently for complete clutch disengagement; and conversely, if the pedal is arranged for adequate retraction of the pressure plate the mechanical advantage is necessarily decreased and the pedal is harder to depress, thus requiring additional effort. Therefore, it will be seen that the ratio between the pedal movement and amount of spring deflection is in conflict with the ratio between the pedal movement and pressure plate retraction.

With the present invention, the ratio between the pedal movement and the pressure plate retraction may be selected as desired and is fairly constant; that is, constant within the meaning of an ordinary mechanical organization. For instance, in Figs. 1 to 7 the pedal rocks the throw-out shaft 41, and the yoke 48 is so arranged that its leverage action does not appreciably vary in the normal operation of the parts. In Fig. 8 the arm 73 and the arm 75 are arranged so that the ratio between the clutch pedal and the throw-out bearing of the clutch, and therefore the pressure plate, does not materially change in the normal operation of the parts. Yet the ratio between the pedal movement and the spring deflection increases in the clutch disengaging action, with the result that the mechanical advantage increases. As the point 52 shifts from position A to position C of Fig. 2, the ratio between the pedal movement and spring compression progressively increases, thus requiring greater and greater pedal movement for a given amount of spring compression. In Fig. 7 the ratio increases as the spring is tensioned. In Fig. 8 the ratio of pedal movement to spring compression increases as the point 52 moves from position A to position C. Yet in all these forms, while the ratio between pedal movement and spring deflection increases, to the end that there is a very low pedal pressure required at the terminal position, or position of substantially complete clutch disengagement, the ratio does not change substantially as between the movements of lever and the clutch throw-out bearing, and therefore the clutch plate, so that an adequate clutch pressure plate movement is provided. A relatively great spring deflection is not necessary so long as the spring pressure is removed from the clutch. But a considerable travel of the pressure plate is desired. The arrangements, as shown, provide for a relatively small spring deflection and relatively great pressure plate movement. In this way a clutch of adequate torque capacity may be released and held released with a minimum of effort and at the same time there is adequate movement of the pressure plate for an efficient clutch releasing action.

I claim:

1. In a clutch, the combination of driving and driven members arranged to be packed together for clutch engagement and to be released from packed relationship for clutch disengagement, a single spring means for exerting force for packing the clutch members together, reaction means for the spring means, a movable member having an operable connection with the clutch for packing the members together, reaction means for the movable member, a connection on the movable member through which the single spring means exerts force on the movable member, said connection being relatively remote from a center line through the two reaction means when the clutch is engaged for providing relatively high mechanical advantage for the single spring means, a manually operable control member for shifting the said movable member to take the force of the single spring means and to relieve the clutch members of such force for clutch disengagement, said connection on the movable member shifting to a position relatively close to and on the same side of said center line when the manually operable control member is shifted substantially to the position of maximum movement to provide a relatively low mechanical advantage for the single spring means, whereby the force of the spring may be overcome, while the clutch is disengaged, with light physical effort.

2. In a clutch, the combination of driving and driven members arranged to be packed together for clutch engagement and to be released from packed relationship for clutch disengagement, spring means for exerting force for packing the clutch members together, a pivoted member for transmitting packing forces of the spring means to the clutch, a manually operable control member for shifting the pivoted member to relieve the clutch of packing pressure, reaction means for the spring means, a connection on the pivoted member through which the forces of the spring means are transmitted, said pivoted member and spring means being arranged so that, when the clutch is engaged, the said connection through which the forces of the spring means are transmitted is relatively remote from a center line drawn through the pivot point of said member and the said reaction means to provide a relatively high moment for the spring means, and so that upon movement of the control member for clutch disengagement, said connection moves relatively close to the center line and on the same side thereof to decrease the moment of the spring whereby the change in mechanical advantage for the spring means takes place about the pivot of the pivoted member.

3. In a clutch, the combination of driving and driven members arranged to be packed together for clutch engagement and to be released from packed relationship for clutch disengagement, one of said driving members being axially shiftable, clutch control levers of the second order having their ends disposed in proximity to the clutch axis and for transmitting axial forces to the shiftable clutch member, an axially shiftable thrust member for engaging the inner ends of the levers, means for shifting the thrust member including a pivotally mounted member, a spring having a point of connection with the pivotally mounted member, a reaction member for the spring, the point of connection being relatively remote from a center line through the pivot for said member and the reaction means for the spring, whereby the spring exerts a relatively high turning moment on said pivoted member with resultant relatively high axial pressure on the thrust member for clutch engagement, and a manually movable control member for shifting the pivoted member to take the forces of the spring for clutch disengagement, said point of connection progressively shifting toward said center line upon movement of the control member, whereby the physical effort required for clutch release progressively diminishes.

4. In a clutch, the combination of clutch driving and driven members arranged to be engaged and disengaged, spring means for packing the members into engagement, a substantially fixed reaction member for the spring means, a pivoted member having a pivot fixed in relation to the reaction member through which the force of the spring means is transmitted for clutch engagement, a connection on the pivoted member through which the force of the spring means is transmitted, a control element shiftable to rock the pivoted member and take the load of the spring means for clutch disengagement, the pivoted member, the spring means, the reaction member and the said connection being so arranged and constructed that the said connection is relatively remote from a line through the pivot and the reaction means when the clutch is engaged for a relatively high mechanical advantage between the pivoted member and the line of action of the spring, and relatively close to said line and on the same side thereof when the clutch is disengaged for a relatively low mechanical advantage between the pivoted member and the line of action of the spring, with the change of mechanical advantage occurring substantially solely about the pivot of the pivoted member.

5. In a clutch, the combination of clutch driving and driven members arranged to be engaged and disengaged, spring means for packing the members into engagement, a substantially fixed reaction member for the spring means, a pivoted member operably associated with the clutch and through which the force of the spring means is transmitted for clutch engagement, a connection on the pivoted member through which the force of the spring means is transmitted, a control element shiftable to rock the pivoted member and take the load of the spring means for clutch disengagement, the pivoted member, spring means and the connection therebetween being so arranged and constructed that the mechanical advantage between the pivoted member and the line of action of the spring means is relatively high when the clutch is engaged by the spring means, and relatively low when the clutch is disengaged, whereby relatively light effort will hold the load of the spring means at clutch disengagement and the arrangement being such that substantially all change of mechanical advantage occurs substantially solely about the pivot of the pivoted member.

6. In a clutch, the combination of clutch driving and driven members arranged to be engaged and disengaged, packing means for packing the members into engagement, a substantially fixed reaction member for the packing means, a pivoted member operably associated with the clutch and through which the force of the packing means is transmitted for clutch engagement, a connection on the pivoted member through which the force of the packing means is transmitted, a control element shiftable to rock the pivoted member and take the load of the packing means for clutch disengagement, the pivoted member, packing means and the connection therebetween being so arranged and constructed that the mechanical advantage between the pivoted member and the line of action of the packing means is relatively high when the clutch is engaged whereby a relatively high packing pressure is applied to the clutch, and relatively low when the clutch is disengaged, whereby relatively light effort will hold the load of the packing means at clutch disengagement and the arrangement being such that substantially all change of mechanical advantage occurs substantially solely about the pivot of the pivoted member.

7. In a clutch, the combination of clutch driving and driven members arranged to be engaged and disengaged, spring means located outside the clutch structure for packing the members into engagement, a substantially fixed reaction member for the spring means, means for transmitting the packing force including a pivoted member having a connection with the spring means and a shiftable thrust member having an operable association with the pivoted member for transmitting the force to the clutch, a control element shiftable to rock the pivoted member and take the load of the spring means for clutch disengagement, the pivoted member, spring means and the connection therebetween being so arranged and constructed that the mechanical advantage between the pivoted member and the line of action of the spring means is relatively high when the clutch is engaged for effecting relatively high packing pressure on the clutch and relatively low when the clutch is disengaged whereby relatively light effort will hold the load of the spring at clutch disengagement and the arrangement being such that substantially all change of mechanical advantage occurs substantially solely about the pivot of the pivoted member.

8. In a clutch, the combination of clutch driving and driven members arranged to be engaged and disengaged, spring means located outside the clutch structure for packing the members into engagement, a substantially fixed reaction member for the spring means, means for transmitting the packing force including a pivoted member having a connection with the spring means and a shiftable thrust member having an operable association with the pivoted member for transmitting the force to the clutch, a control element shiftable to rock the pivoted member and take the load of the spring means for clutch disengagement, the pivoted member, spring means and the connection therebetween being so arranged and constructed that the mechanical advantage between the pivoted member and the line of action of the spring means is relatively high when the clutch is engaged for effecting relatively high packing pressure on the clutch and relatively low when the clutch is disengaged whereby relatively light effort will hold the load of the spring at clutch disengagement and the arrangement being such that substantially all change of mechanical advantage occurs substantially solely about the pivot of the pivoted member, and means operably connecting the control element and the shiftable thrust member for retracting the thrust member upon clutch disengaging movement of the control element, said last named means being arranged to provide a substantially unchanging mechanical ratio between the control element and the thrust member.

ERNEST E. WEMP.